(12) United States Patent
Kim et al.

(10) Patent No.: US 9,862,244 B2
(45) Date of Patent: Jan. 9, 2018

(54) INTEGRATED INDEPENDENT AIR CONDITIONING SYSTEM AND METHOD FOR CONTROLLING THE SAME

(71) Applicant: Hyundai Motor Company, Seoul (KR)

(72) Inventors: Jae Woong Kim, Hwaseong-si (KR); Jae Woo Park, Ansan-si (KR); Man Ju Oh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 142 days.

(21) Appl. No.: 15/069,662

(22) Filed: Mar. 14, 2016

(65) Prior Publication Data

US 2017/0096044 A1    Apr. 6, 2017

(30) Foreign Application Priority Data

Oct. 6, 2015    (KR) .......................... 10-2015-0140127

(51) Int. Cl.
| | | |
|---|---|---|
| *B60H 1/00* | (2006.01) | |
| *B60H 1/22* | (2006.01) | |
| *B60N 2/56* | (2006.01) | |

(52) U.S. Cl.
CPC ....... *B60H 1/0025* (2013.01); *B60H 1/00278* (2013.01); *B60H 1/00478* (2013.01); *B60H 1/00828* (2013.01); *B60H 1/00885* (2013.01); *B60H 1/2218* (2013.01); *B60N 2/5685* (2013.01); *B60H 2001/00242* (2013.01); *B60H 2001/00307* (2013.01); *B60H 2001/00949* (2013.01)

(58) Field of Classification Search
CPC ............ B60H 1/00478; B60H 1/00285; B60H 1/0025; B60H 1/00278; B60H 1/00885; B60H 2001/00307; B60H 2001/00928; B60H 1/323
See application file for complete search history.

(56) References Cited

U.S. PATENT DOCUMENTS

2014/0165596 A1*   6/2014   Freese ................ B60H 1/00478
                                                                   62/3.2

FOREIGN PATENT DOCUMENTS

| JP | 2004-203336 A | 7/2004 |
|---|---|---|
| JP | 2012-011929 A | 1/2012 |
| KR | 10-2004-0009281 A | 1/2004 |

(Continued)

*Primary Examiner* — Cassey D Bauer
(74) *Attorney, Agent, or Firm* — Morgan, Lewis & Bockius LLP

(57) ABSTRACT

An integrated independent air conditioning system may include a refrigerant line, including a compressor, a condenser, and an evaporator core, a Peltier heat exchanger to perform air conditioning through a Peltier element, a ventilated seat for a vehicle in which a blower and a heat exchanger are arranged, a cooling circulation line arranged such that coolant passes through a first pump, the evaporator core, an on-off valve, the Peltier heat exchanger, and a first 3-way valve, a seat circulation line that passes through the heat exchanger and joins an upper side of the first pump, a heating circulation line arranged such that coolant passes through a second pump, the condenser of the refrigerant line, a second 3-way valve, the Peltier heat exchanger, and the first 3-way valve, a radiator circulation line that passes through a radiator, and joins an upper side of the second pump, and a controller.

13 Claims, 7 Drawing Sheets

(56) References Cited

FOREIGN PATENT DOCUMENTS

| KR | 10-2006-0122037 A | 11/2006 |
|---|---|---|
| KR | 2009-0020369 A | 2/2009 |
| KR | 10-2011-0134213 A | 12/2011 |
| KR | 10-2012-0014621 A | 2/2012 |
| KR | 2014-0109093 A | 9/2014 |

\* cited by examiner

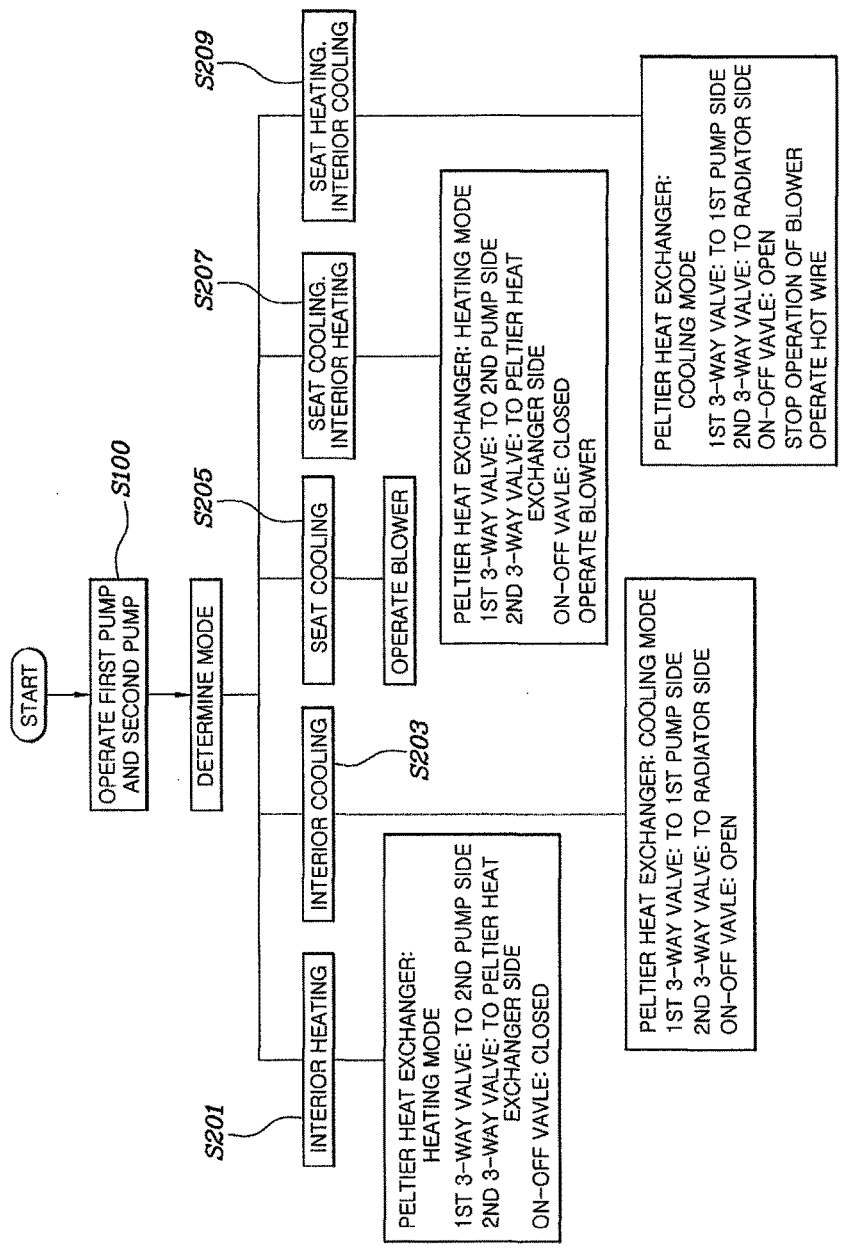

INTEGRATED INDEPENDENT AIR CONDITIONING SYSTEM AND METHOD FOR CONTROLLING THE SAME

CROSS REFERENCE TO RELATED APPLICATION

The present application claims priority to Korean Patent Application No. 10-2015-0140127, filed Oct. 6, 2015, the entire contents of which is incorporated herein for all purposes by this reference.

BACKGROUND OF THE INVENTION

Field of the Invention

The present invention generally relates to an air conditioning system for rear passengers of a vehicle and, more particularly, to an integrated air conditioning system that integrates a seat and air conditioning system to be controlled together rather than using an existing air conditioning system installed in the vehicle.

Description of Related Art

Generally, an air conditioning system is installed in a vehicle for user convenience, so that the indoor temperature may be controlled to provide a pleasant environment to passengers and to secure a driver with a clear view so that frost or condensation occurring on the windshield of the vehicle does not obstruct the driver's view.

Such an air conditioning system is configured to include a cooling system and heating system to adjust the indoor temperature to the desired temperature. The cooling system arranges an evaporator core in the refrigerant line, circulates the cold refrigerant in the evaporator core, and enables heat exchange between the refrigerant inside the evaporator and the air outside the evaporator, whereby the air to be provided to the vehicle interior is cooled.

However, because the basic air conditioning system of the vehicle is disposed near an engine room at the front of the vehicle, the air, conditioned through this system, is sufficiently provided to the front passengers but is not suitably delivered to the rear passengers because of the air distribution path and the like.

Also, a rear seat equipped with a thermoelectric heating and cooling function has lower performance compared to the front seat, due to a layout problem attributable to the position of a fuel tank, etc., The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air conditioning system in which a seat and an air conditioning function are integrated to be controlled together by arranging an independent air conditioning system for rear passengers, which is separate from an existing air condition system of a vehicle.

According to various aspects of the present invention, an integrated independent air conditioning system may include a refrigerant line, through which a refrigerant circulates, including a compressor, a condenser, and an evaporator core, a Peltier heat exchanger selectively fluidly coupled to the evaporator core or condenser and arranged to perform air conditioning of a vehicle interior through a Peltier element, a ventilated seat for a vehicle in which a blower and a heat exchanger are arranged, a cooling circulation line arranged such that coolant passes through a first pump, the evaporator core of the refrigerant line, an on-off valve, the Peltier heat exchanger, and a first 3-way valve, a seat circulation line that branches off from an upper side of the on-off valve of the cooling circulation line, passes through the heat exchanger of the ventilated seat, and then joins an upper side of the first pump, a heating circulation line arranged such that coolant passes through a second pump, the condenser of the refrigerant line, a second 3-way valve, the Peltier heat exchanger, and the first 3-way valve, a radiator circulation line that branches off from the second 3-way valve of the heating circulation line, passes through a radiator, and then joins an upper side of the second pump, and a controller for controlling operations of the on-off valve, the Peltier heat exchanger, the blower, the first 3-way valve, the second 3-way valve, the first pump, and the second pump.

The Peltier heat exchanger may be disposed in a console between front and rear seats of the vehicle to perform air conditioning of a rear seat space in the vehicle.

A hot wire may be disposed in the ventilated seat, and the ventilated seat may be heated through the hot wire.

In a cooling mode of the vehicle interior, the controller may be configured to open the on-off valve, control the Peltier heat exchanger to be in a cooling mode, control the first 3-way valve to allow the coolant, which passed through the Peltier heat exchanger, to flow into the first pump, and control the second 3-way valve to allow the coolant, which passed through the condenser, to flow into the radiator.

In a heating mode of the vehicle interior, the controller may be configured to close the on-off valve, control the Peltier heat exchanger to be in a heating mode, control the first 3-way valve to allow the coolant, which passed through the Peltier heat exchanger, to flow into the second pump, and control the second 3-way valve to allow the coolant, which passed through the condenser, to flow into the Peltier heat exchanger.

In a cooling mode of the ventilated seat for the vehicle, the controller may be configured to operate the blower of the ventilated seat to generate cool air in the ventilated seat through cool coolant flowing in the heat exchanger of the ventilated seat.

In the cooling mode of the ventilated seat for the vehicle, the controller may be configured to operate both the first pump and the second pump.

A hot wire may be disposed in the ventilated seat, and the controller may be configured to stop an operation of the blower of the ventilated seat and operate the hot wire to heat the ventilated seat in a heating mode of the ventilated seat for the vehicle.

The controller may be configured to operate both the first pump and the second pump when performing air conditioning of the vehicle interior.

A hot wire may be disposed in the ventilated seat, and when a cooling mode of the vehicle interior and a heating mode of the ventilated seat for the vehicle are set, the controller may be configured to open the on-off valve, control the Peltier heat exchanger to be in a cooling mode, control the first 3-way valve to allow the coolant, which passed through the Peltier heat exchanger, to flow into the first pump, control the second 3-way valve to allow the coolant, which passed through the condenser, to flow into the radiator, stop an operation of the blower of the ventilated seat, and operate the hot wire.

When a heating mode of the vehicle interior and a cooling mode of the ventilated seat for the vehicle are set, the controller may be configured to close the on-off valve, control the Peltier heat exchanger to be in a heating mode, control the first 3-way valve to allow the coolant, which passed through the Peltier heat exchanger, to flow into the second pump, control the second 3-way valve to allow the coolant, which passed through the condenser, to flow into the Peltier heat exchanger, and operate the blower of the ventilated seat.

According to various aspects of the present invention, a control method for controlling an integrated independent air conditioning system may include a start step in which a controller operates both a first pump and a second pump, an interior heating step in which, in a heating mode of a vehicle interior, the controller closes an on-off valve, controls a Peltier heat exchanger to be in a heating mode, controls a first 3-way valve to enable coolant, which passed through the Peltier heat exchanger, to flow into the second pump, and controls a second 3-way valve to allow the coolant, which passed through a condenser, to flow into the Peltier heat exchanger, an interior cooling step in which, in a cooling mode of a vehicle interior, the controller opens the on-off valve, controls the Peltier heat exchanger to be in a cooling mode, controls the first 3-way valve to allow the coolant, which passed through the Peltier heat exchanger, to flow into the first pump, and controls the second 3-way valve to allow the coolant, which passed through the condenser, to flow into a radiator, and a seat cooling step in which, in a cooling mode of a ventilated seat for a vehicle, the controller operates a blower of the ventilated seat to generate cool air in the ventilated seat through the cool coolant flowing in a heat exchanger of the ventilated seat, in which the integrated independent air conditioning system may include a refrigerant line, through which a refrigerant circulates, including a compressor, the condenser, and an evaporator core, the Peltier heat exchanger selectively fluidly coupled to the evaporator core or condenser and arranged to perform air conditioning of the vehicle interior through a Peltier element, a ventilated seat for the vehicle in which the blower and a heat exchanger are arranged, a cooling circulation line arranged such that coolant passes through the first pump, the evaporator core of the refrigerant line, the on-off valve, the Peltier heat exchanger, and the first 3-way valve, a seat circulation line that branches off from an upper side of the on-off valve of the cooling circulation line, passes through the heat exchanger of the ventilated seat, and then joins an upper side of the first pump, a heating circulation line arranged such that coolant passes through the second pump, the condenser of the refrigerant line, the second 3-way valve, the Peltier heat exchanger, and the first 3-way valve, a radiator circulation line that branches off from the second 3-way valve of the heating circulation line, passes through the radiator, and then joins an upper side of the second pump, and the controller for controlling operations of the on-off valve, the Peltier heat exchanger, the blower, the first 3-way valve, the second 3-way valve, the first pump, and the second pump.

As described above, the integrated independent air conditioning system and a method for controlling the system, according to the present invention, may quickly provide rear passengers with a pleasant environment through an independent air conditioning system for rear seats, and may enable not only integrated control of the seats and an air conditioning function but also individual control of air heating and cooling and seat heating and cooling for the passengers, thus improving the satisfaction of the rear passengers.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a flowchart of an exemplary method for controlling an integrated independent air conditioning system according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
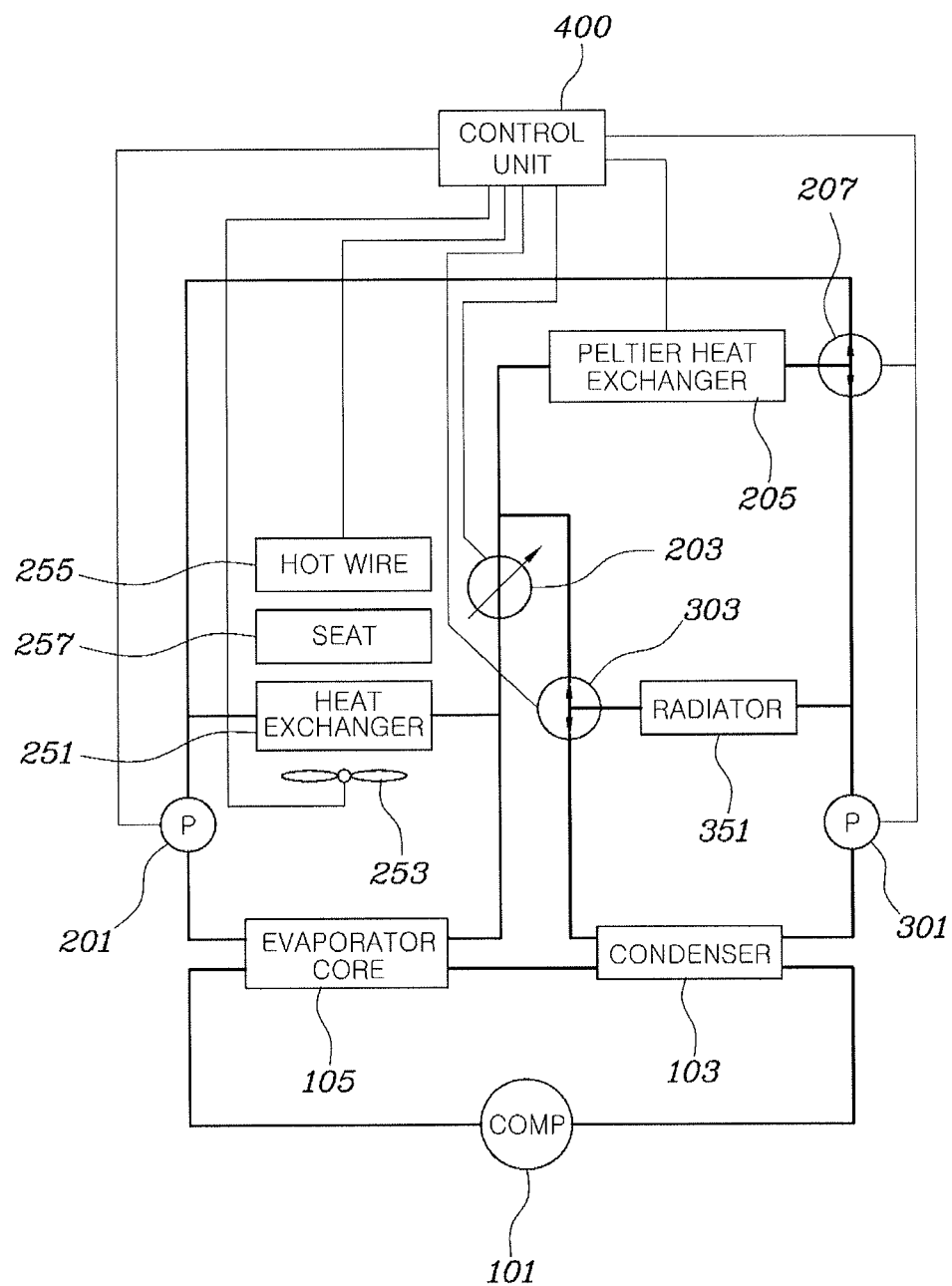
FIG. 1 is a block diagram of an exemplary integrated independent air conditioning system according to the present invention.
Figure 2:
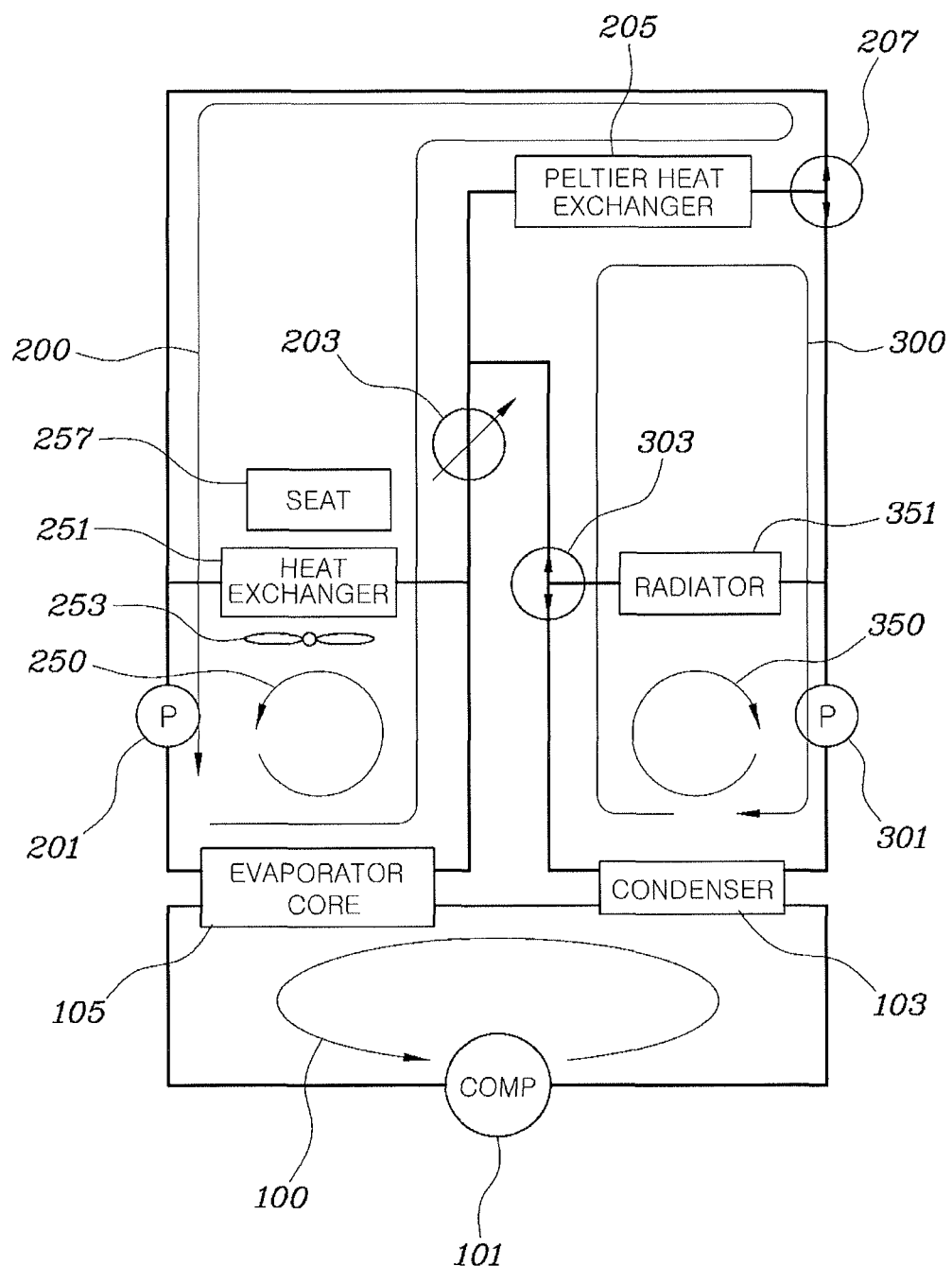
FIG. 2 is a block diagram of a circulation line of the exemplary integrated independent air conditioning system according to the present invention.
Figure 3:
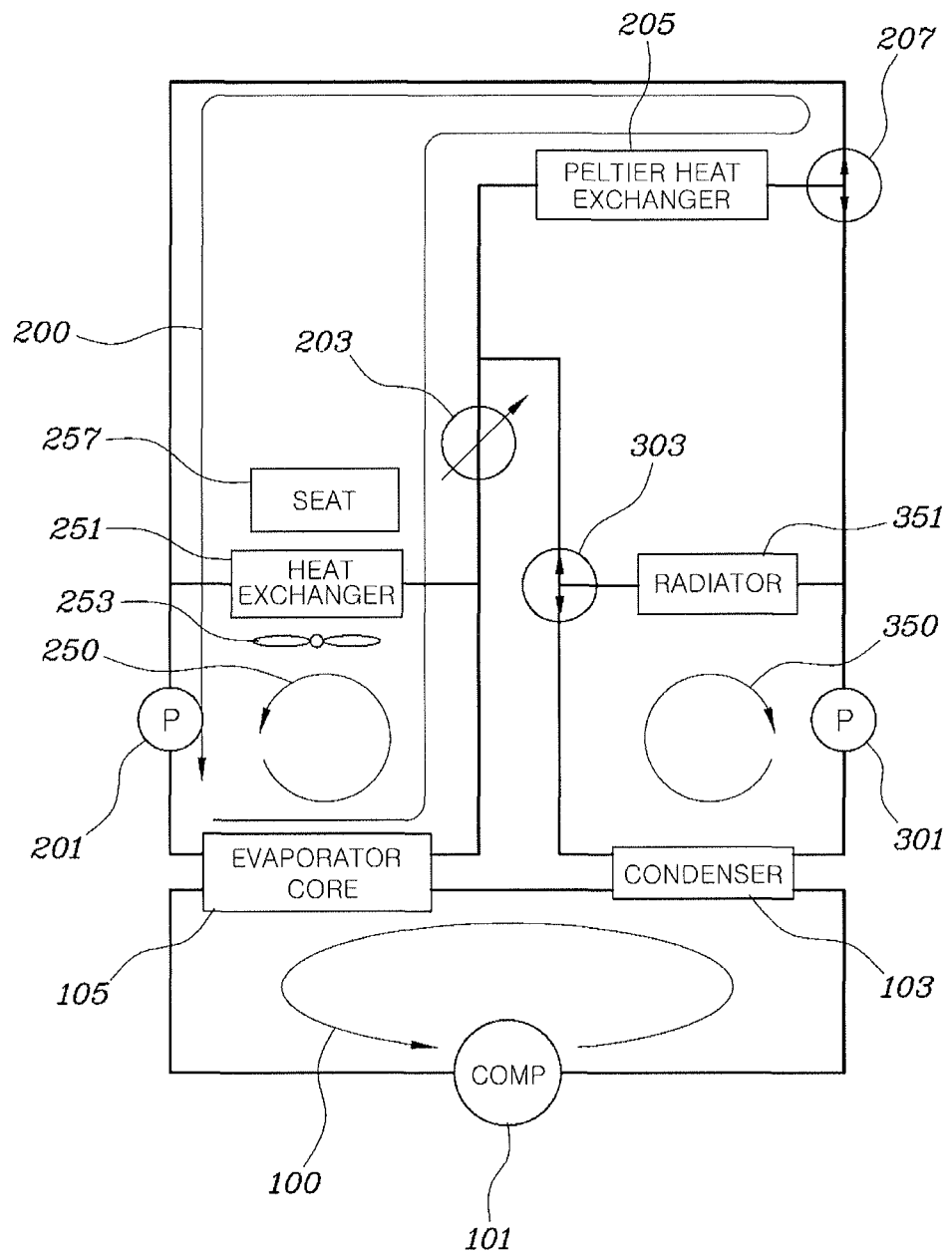
FIG. 3 is a view illustrating an operation of a seat and interior cooling mode in the exemplary integrated independent air conditioning system according to the present invention.
Figure 4:
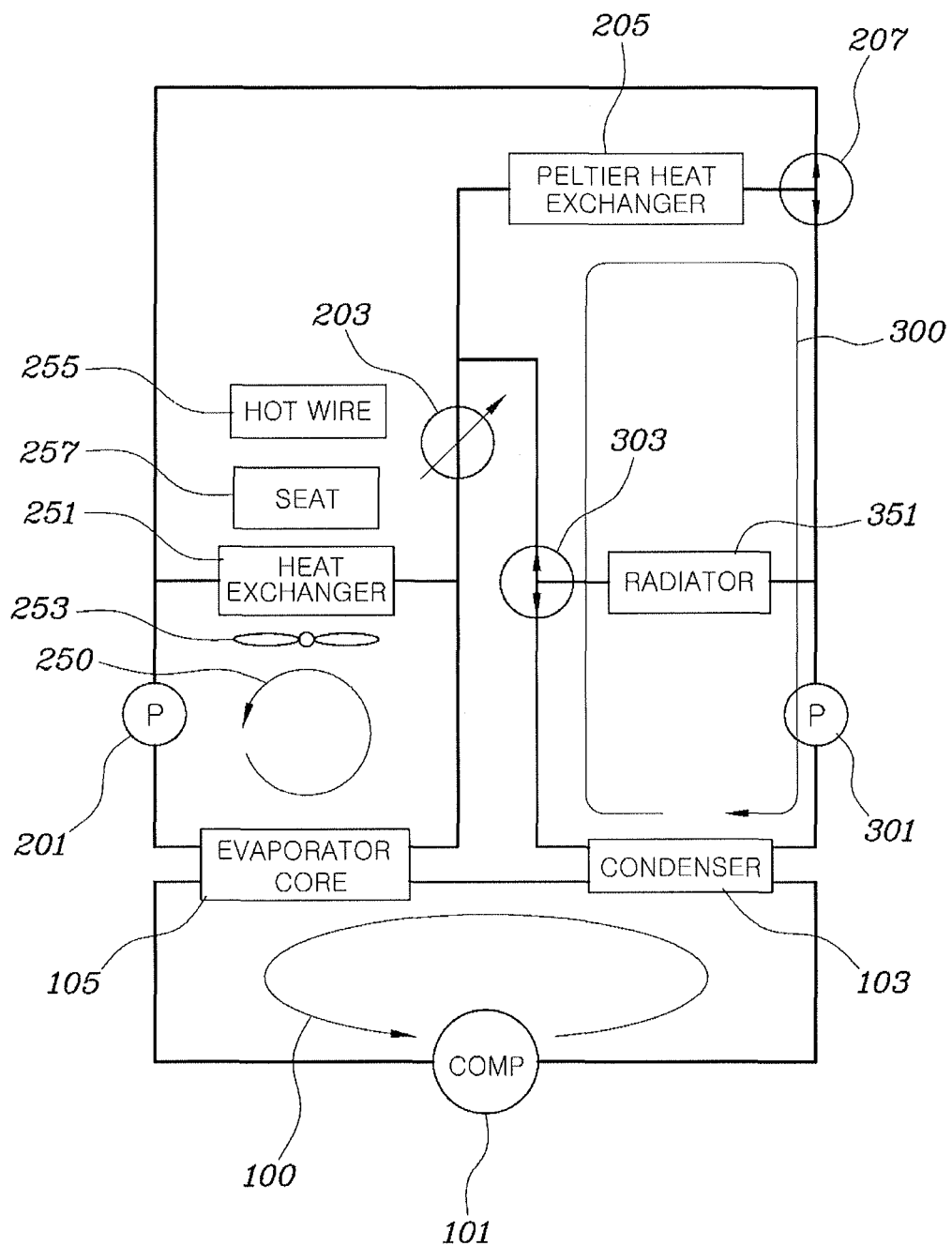
FIG. 4 is a view illustrating an operation of a seat and interior heating mode in the exemplary integrated independent air conditioning system according to the present invention.
Figure 5:
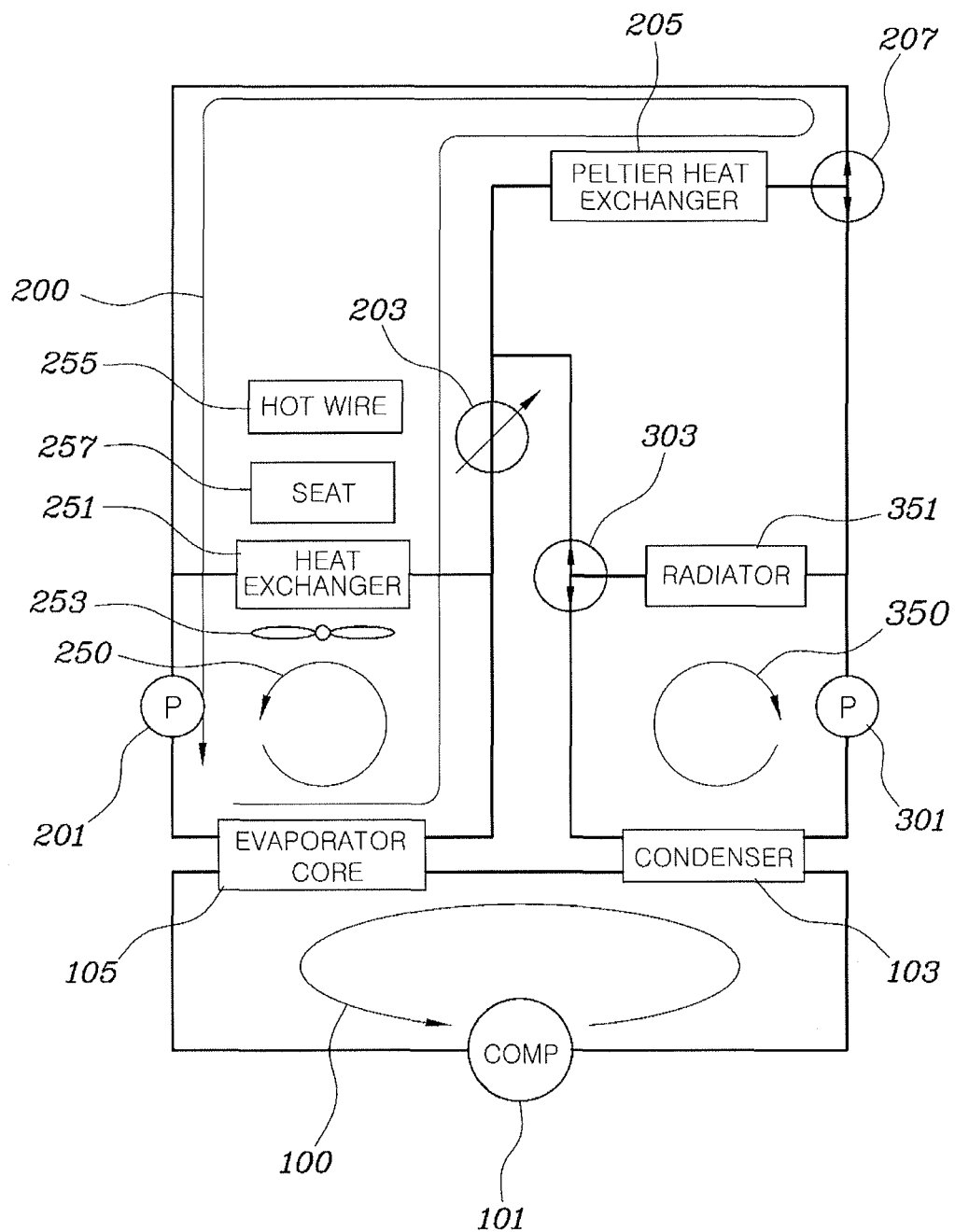
FIG. 5 is a view illustrating an operation of a seat heating mode and interior cooling mode in the exemplary integrated independent air condition system according to the present invention.
Figure 6:
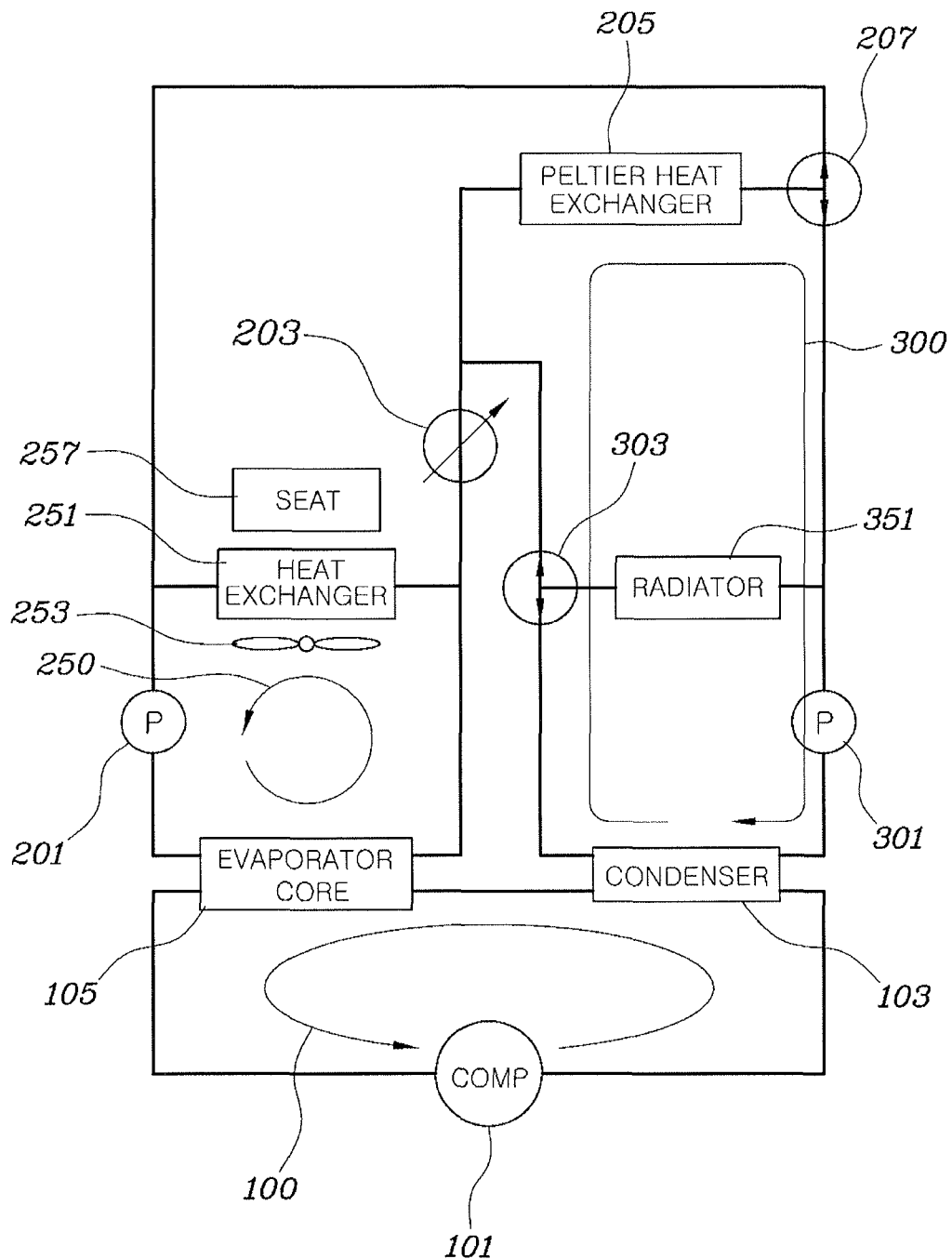
FIG. 6 is a view illustrating an operation of a seat cooling mode and interior heating mode in the exemplary integrated independent air conditioning system according to the present invention.

FIG. 1 is a block diagram of an integrated independent air conditioning system according to various embodiments of the present invention, FIG. 2 is a block diagram of the circulation line of an integrated independent air conditioning system according to various embodiments of the present invention, FIG. 3 is a view illustrating the operation of a seat and interior air cooling mode in an integrated independent air conditioning system according to various embodiments of the present invention, FIG. 4 is a view illustrating the operation of a seat and interior air heating mode in an integrated independent air conditioning system according to various embodiments of the present invention, FIG. 5 is a view illustrating the operation of a seat heating mode and interior cooling mode in an integrated independent air condition system according to various embodiments of the present invention, FIG. 6 is a view illustrating the operation of a seat cooling mode and interior heating mode in an integrated independent air conditioning system according to various embodiments of the present invention, and FIG. 7 is a flowchart of a method for controlling an integrated independent air conditioning system according to various embodiments of the present invention.

The controller 400, illustrated in FIG. 1, is a component existing in the configurations of FIGS. 2 to 6, but is omitted to improve understanding of the drawings. Also, in FIGS. 1 to 6, when a hot wire 255 is illustrated, this indicates that the hot wire 255 is operating, whereas when the hot wire 255 is not illustrated, this indicates that the hot wire 255 is not operating rather than not being included in the configuration.

The integrated independent air conditioning system according to the present invention includes a refrigerant line 100, through which a refrigerant circulates, comprising a compressor 101, a condenser 103, and an evaporator core 105, a Peltier heat exchanger 205 arranged for vehicle interior air conditioning using a Peltier element, a ventilated seat 257 in which a blower 253 and a heat exchanger 251 are arranged, a cooling circulation line 200 arranged such that coolant passes through a first pump 201, the evaporator core 105 of the refrigerant line 100, an on-off valve 203, the Peltier heat exchanger 205, and a first 3-way valve 207, a seat circulation line 250 that branches off from the upper side of the on-off valve 203 of the cooling circulation line 200, passes through the heat exchanger 251 of the ventilated seat 257, and then joins the upper side of the first pump 201, a heating circulation line 300 arranged such that coolant passes through a second pump 301, the condenser 103 of the refrigerant line 100, a second 3-way valve 303, the Peltier heat exchanger 205, and the first 3-way valve 207, a radiator circulation line 350 that branches off from the second 3-way valve 303 of the heating circulation line 300, passes through a radiator 351, and then joins the upper side of the second pump 301, and a controller 400 for controlling the operations of the on-off valve 203, the Peltier heat exchanger 205, the blower 253, the first 3-way valve 207, the second 3-way valve 303, the first pump 201, and the second pump 301.

The Peltier heat exchanger 205 is arranged in the console between the front and rear seats of the vehicle, and may perform air conditioning of the rear seat space in the vehicle.

In the ventilated seat 257, a hot wire 255 is arranged for heating of the ventilated seat 257.

The air conditioning system, basically installed in the vehicle, is disposed near an engine room at the front of the vehicle. Accordingly, air that is conditioned through this system is sufficiently provided to front passengers so as to make a pleasant environment, but is not suitably delivered to rear passengers because of the air distribution path and the like. Therefore, the present invention intends to provide an independent air conditioning system for rear passengers.

The integrated independent air conditioning system according to the present invention is an air conditioning system for rear seats that is separate from the primary existing air conditioning system, and performs heating and cooling of the ventilated seat 257 of the rear seats and performs indoor air heating and cooling through the console. According to a situation, the system may cool the ventilated seat 257 while heating the indoor air, or may heat the ventilated seat 257 while cooling the indoor air.

Referring to FIGS. 1 and 2, the integrated independent air conditioning system comprises the cooling circulation line 200, the seat circulation line 250, the heating circulation line 300, and the radiator circulation line 350. The cooling circulation line 200 is arranged such that the coolant passes through the first pump 201, the evaporator core 105 of the refrigerant line 100, the on-off valve 203, the Peltier heat exchanger 205, and the first 3-way valve 207. The seat circulation line 250 branches off from the upper side of the on-off valve 203 of the cooling circulation line 200, passes through the heat exchanger 251 of the ventilated seat 257, and then joins the upper side of the first pump 201. The heating circulation line 300 is arranged such that the coolant passes through the second pump 301, the condenser 103 of the refrigerant line 100, the second 3-way valve 303, the Peltier heat exchanger 205, and the first 3-way valve 207. The radiator circulation line 350 branches off from the second 3-way valve 303 of the heating circulation line 300, passes through the radiator 351, and then joins the upper side of the second pump 301.

The condenser 103 of the refrigerant line 100 is a heat exchanger in the form of a chiller in which a tube carrying the refrigerant and a tube carrying the coolant of the heating circulation line 300 are arranged alternatively to be in contact with each other. Similarly, the evaporator core 105 of the refrigerant line 100 is a heat exchanger in the form of a chiller in which a tube carrying the refrigerant and a tube carrying the coolant of the cooling circulation line 200 are arranged alternatively to be in contact with each other. The refrigerant line 100 is controlled to operate whenever the air conditioning of the rear seat or the cooling of the seat 257 is necessary.

The Peltier heat exchanger 205 is arranged such that one side thereof contacts with a tube and the other side thereof has a radiation fin. The tube contacting with the one side of the Peltier heat exchanger may carry coolant that is cooled or heated through the control of the on-off valve 203 or the first 3-way valve 207. The cooled or heated coolant may be cooled or heated through the Peltier element.

The ventilated seat 257 comprises the heat exchanger 251, the blower 253, and the hot wire 255. When cooling the seat 257, the blower 253 is operated and cooled air is provided to the seat 257 through the heat exchanger 251. When heating the seat, the operation of the blower 253 is stopped and the hot wire 255 of the seat 257 is operated for heating.

In the cooling mode of the vehicle interior, the controller 400 opens the on-off valve 203, and controls the Peltier heat exchanger 205 to be in a cooling mode. Also, it controls the first 3-way valve 207 to enable the coolant, which passed through the Peltier heat exchanger 205, to flow in the first pump 201, and controls the second 3-way valve 303 to enable the coolant, which passed through the condenser 103, to flow in the radiator 351.

In the cooling mode of the vehicle interior, the cooling circulation line 200 is operated. The coolant, which was cooled while passing the evaporator core 105 of the refrigerant line 100, is further cooled by passing the Peltier heat exchanger 205. Then, when the blower provides wind to the Peltier heat exchanger 205, the cooled air is supplied to the interior of the vehicle.

The coolant, which was heated while passing the condenser 103 of the refrigerant line 100, circulates through the radiator circulation line 350. Specifically, the coolant repeats the processes of being provided to the radiator 351 through the second 3-way valve 303, radiating heat, and then passing the condenser 103 again through the second pump 301. Accordingly, the cooled coolant and heated coolant circulates through the separate lines not to be mixed with each other.

In the heating mode of the vehicle interior, the controller 400 closes the on-off valve 203, and controls the Peltier heat exchanger 205 to be in a heating mode. Also, it controls the first 3-way valve 207 to enable the coolant, which passed through the Peltier heat exchanger 205, to flow in the second pump 301, and controls the second 3-way valve 303 to enable the coolant, which passed through the condenser 103, to flow in the Peltier heat exchanger 205.

In the heating mode of the vehicle interior, the heating circulation line 300 is operated. The coolant, which was heated while passing the condenser 103 of the refrigerant line 100, is further heated by passing the Peltier heat exchanger 205. Then, when the blower provides wind to the Peltier heat exchanger 205, the heated air is supplied to the interior of the vehicle.

The coolant, which was cooled while passing the evaporator core 105 of the refrigerant line 100, circulates through the seat circulation line 250. Specifically, by closing the on-off valve 203, the coolant repeats the processes of being provided to the heat exchanger 251 of the seat 257 and passing the evaporator core 105 again through the first pump 201. Accordingly, the cooled coolant and heated coolant circulates through the separate lines not to be mixed with each other.

In the cooling mode of the ventilated seat 257, the controller 400 operates the blower 253 of the ventilated seat 257 to generate cool air in the ventilated seat 257 through the cool coolant flowing in the heat exchanger 251 of the ventilated seat 257.

In the cooling mode of the ventilated seat 257, the controller 400 may operate both the first pump 201 and the second pump 301.

Because the present invention has a structure in which the coolant is heated or cooled through the circulation of the refrigerant line 100, even if only the seat circulation line 250 for acquiring cool air of the evaporator core 105 is necessary, the radiator circulation line 350 must also be operated. The operation of the radiator circulation line 350 radiates the heat of the condenser 103 of the refrigerant line 100, so that the refrigerant line 100 is prevented from overheating and may be normally operated. Therefore, in the cooling mode of the ventilated seat 257, the controller 400 operates both the first pump 201 and the second pump 301.

The ventilated seat 257 arranges the hot wire 255. In the heating mode of the ventilated seat 257, the controller 400 stops the operation of the blower 253 of the ventilated seat 257 and operates the hot wire 255 to heat the ventilated seat 257.

Even though the coolant always circulates through the seat circulation line 250 to provide the coolant to the heat exchanger 251 of the ventilated seat 257, the cool air cannot be supplied to the seat 257 if the blower 253 is not operated. Also, because heat is supplied to the seat 257 through the hot wire 255, the independent control is available regardless of whether to heat or cool the indoor air of the vehicle.

When air conditioning of the vehicle interior is performed, the controller 400 may operate both the first pump 201 and the second pump 301.

As described above, because the present invention has a structure in which the coolant is heated or cooled through the circulation of the refrigerant line 100, even if only the cooling circulation line 200 for acquiring cool air of the evaporator core 105 is necessary, the radiator circulation line 350 must also be operated. The operation of the radiator circulation line 350 radiates the heat of the condenser 103 of the refrigerant line 100, so that the refrigerant line 100 is prevented from overheating and may be normally operated. Therefore, in the cooling mode of the ventilated seat 257, the controller 400 operates both the first pump 201 and the second pump 301.

The ventilated seat 257 arranges the hot wire 255. When the cooling mode of the vehicle interior and the heating mode of the ventilated seat 257 are set, the controller 400 opens the on-off valve 203, and controls the Peltier heat exchanger 205 to be in a cooling mode. Also, it controls the first 3-way valve 207 to enable the coolant, which passed through the Peltier heat exchanger 205, to flow in the first pump 201, controls the second 3-way valve 303 to enable the coolant, which passed through the condenser 103, to flow in the radiator 351, stops the operation of the blower 253 of the ventilated seat 257, and operates the hot wire 255.

In the cooling mode of the vehicle interior, the cooling circulation line 200 is operated. The coolant, which was cooled while passing the evaporator core 105 of the refrigerant line 100, is further cooled by passing the Peltier heat exchanger 205. Then, when the blower provides wind to the Peltier heat exchanger 205, the cooled air is supplied to the interior of the vehicle. However, in the case of the seat 257, the blower 253 is controlled to be stopped to prevent cool air from being provided to the seat 257 even if the coolant flows in the heat exchanger 251 of the seat 257, and the seat 257 is heated through the separately arranged hot wire 255, so that the seat 257 and the air conditioning state are controlled to satisfy the rear passengers.

When the heating mode of the vehicle interior and the cooling mode of the ventilated seat 257 are set, the controller 400 closes the on-off valve 203, and controls the Peltier heat exchanger 205 to be in a heating mode. Also, it controls the first 3-way valve 207 to enable the coolant, which passed through the Peltier heat exchanger 205, to flow in the second pump 301, controls the second 3-way valve 303 to enable the coolant, which passed through the condenser 103, to flow in the Peltier heat exchanger 205, and operates the blower 253 of the ventilated seat 257.

In the heating mode of the vehicle interior, the heating circulation line 300 is operated. The coolant, which was heated while passing the condenser 103 of the refrigerant line 100, is further heated by passing the Peltier heat exchanger 205. Then, when the blower provides wind to the Peltier heat exchanger 205, the heated air is supplied to the interior of the vehicle. However, not to mix the heated coolant in the heating circulation line 300 and the cooled coolant in the cooling circulation line 200, the on-off valve 203 is closed, and the blower 253 is operated to provide cool air to the seat 257 through the coolant provided to the heat exchanger 251 of the seat 257. As described above, as the heating and cooling of the seat 257 and the heating and cooling state of the indoor air are individually controlled, it is possible to satisfy the rear passengers.

A method for controlling the integrated independent air conditioning system includes a start step (S100) in which the controller 400 operates both the first pump 201 and the second pump 301, an interior heating step (S201) in which, in the heating mode of the vehicle interior, the controller 400 closes the on-off valve 203, controls the Peltier heat exchanger 205 to be in a heating mode, controls the first 3-way valve 207 to enable the coolant, which passed through the Peltier heat exchanger 205, to flow in the second pump 301, and controls the second 3-way valve 303 to enable the coolant, which passed through the condenser 103, to flow in the Peltier heat exchanger 205, an interior cooling step (S203) in which, in the cooling mode of the vehicle interior, the controller 400 opens the on-off valve 203, controls the Peltier heat exchanger 205 to be in a cooling mode, controls the first 3-way valve 207 to enable the coolant, which passed through the Peltier heat exchanger 205, to flow in the first pump 201, and controls the second 3-way valve 303 to enable the coolant, which passed through the condenser 103, to flow in the radiator 351, and a seat cooling step (S205) in which, in the cooling mode of the ventilated seat 257, the controller 400 operates the blower 253 of the ventilated seat 257 to generate cool air in the ventilated seat 257 through the cool coolant flowing in the heat exchanger 251 of the ventilated seat 257.

The method for controlling the integrated independent air conditioning system may further include a seat cooling, interior heating step (S207) which is similar to the interior heating step (S201) described above, and further includes operating the blower 253, and a seat heating, interior cooling step (S209) which is similar to the interior cooling step (S205) described above, and further includes stopping the operation of the blower 253 and operating the hot wire 255. Through the control of the integrated independent air conditioning system, the heating and cooling of the seat 257 and the heating and cooling state of the indoor air may be individually controlled (S207, S209), whereby the rear passengers may be provided with a pleasant environment.

As described above, the integrated independent air conditioning system and a method for controlling the system according to the present invention may quickly provide rear passengers with a pleasant environment through an independent air conditioning system for rear seats, and may enable not only integrated control of the seats and an air conditioning function but also individual control of air heating and cooling and seat heating and cooling for the passengers, thus improving the satisfaction of the rear passengers.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated independent air conditioning system, comprising:
    a refrigerant line, through which a refrigerant circulates, including a compressor, a condenser, and an evaporator core;
    a Peltier heat exchanger arranged to perform air conditioning of a vehicle interior through a Peltier element;
    a ventilated seat for a vehicle in which a blower and a heat exchanger are arranged;
    a cooling circulation line arranged such that coolant passes through a first pump, the evaporator core of the refrigerant line, an on-off valve, the Peltier heat exchanger, and a first 3-way valve;
    a seat circulation line that branches off from an upper side of the on-off valve of the cooling circulation line, passes through the heat exchanger of the ventilated seat, and then joins an upper side of the first pump;
    a heating circulation line arranged such that coolant passes through a second pump, the condenser of the refrigerant line, a second 3-way valve, the Peltier heat exchanger, and the first 3-way valve;
    a radiator circulation line that branches off from the second 3-way valve of the heating circulation line, passes through a radiator, and then joins an upper side of the second pump; and
    a controller for controlling operations of the on-off valve, the Peltier heat exchanger, the blower, the first 3-way valve, the second 3-way valve, the first pump, and the second pump.

2. The integrated independent air conditioning system of claim 1, wherein the Peltier heat exchanger is disposed in a console between front and rear seats of the vehicle to perform air conditioning of a rear seat space in the vehicle.

3. The integrated independent air conditioning system of claim 1, wherein a hot wire is disposed in the ventilated seat, and the ventilated seat is heated through the hot wire.

4. The integrated independent air conditioning system of claim 1, wherein in a cooling mode of the vehicle interior, the controller is configured to open the on-off valve, control the Peltier heat exchanger to be in a cooling mode, control the first 3-way valve to allow the coolant, which passed through through the Peltier heat exchanger, to flow into the first pump, and control the second 3-way valve to allow the coolant, which passed through through the condenser, to flow into the radiator.

5. The integrated independent air conditioning system of claim 1, wherein in a heating mode of the vehicle interior, the controller is configured to close the on-off valve, control the Peltier heat exchanger to be in a heating mode, control the first 3-way valve to allow the coolant, which passed through through the Peltier heat exchanger, to flow into the second pump, and control the second 3-way valve to allow the coolant, which passed through the condenser, to flow into the Peltier heat exchanger.

6. The integrated independent air conditioning system of claim 1, wherein in a cooling mode of the ventilated seat for the vehicle, the controller is configured to operate the blower of the ventilated seat to generate cool air in the ventilated seat through cool coolant flowing in the heat exchanger of the ventilated seat.

7. The integrated independent air conditioning system of claim 6, wherein in the cooling mode of the ventilated seat for the vehicle, the controller is configured to operate both the first pump and the second pump.

8. The integrated independent air conditioning system of claim 1, wherein a hot wire is disposed in the ventilated seat, and the controller is configured to stop an operation of the blower of the ventilated seat and operate the hot wire to heat the ventilated seat in a heating mode of the ventilated seat for the vehicle.

9. The integrated independent air conditioning system of claim 1, wherein the controller is configured to operate both the first pump and the second pump when performing air conditioning of the vehicle interior.

10. The integrated independent air conditioning system of claim 1, wherein a hot wire is disposed in the ventilated seat, and when a cooling mode of the vehicle interior and a heating mode of the ventilated seat for the vehicle are set, the controller is configured to open the on-off valve, control the Peltier heat exchanger to be in a cooling mode, control the first 3-way valve to allow the coolant, which passed through the Peltier heat exchanger, to flow into the first pump, control the second 3-way valve to allow the coolant, which passed through the condenser, to flow into the radiator, stop an operation of the blower of the ventilated seat, and operate the hot wire.

11. The integrated independent air conditioning system of claim 1, wherein when a heating mode of the vehicle interior and a cooling mode of the ventilated seat for the vehicle are set, the controller is configured to close the on-off valve, control the Peltier heat exchanger to be in a heating mode, control the first 3-way valve to allow the coolant, which passed through the Peltier heat exchanger, to flow into the second pump, control the second 3-way valve to allow the coolant, which passed through the condenser, to flow into the Peltier heat exchanger, and operate the blower of the ventilated seat.

12. A control method for controlling an integrated independent air conditioning system, the control method comprising:
a start step in which a controller operates both a first pump and a second pump;
an interior heating step in which, in a heating mode of a vehicle interior, the controller closes an on-off valve, controls a Peltier heat exchanger to be in a heating mode, controls a first 3-way valve to enable coolant, which passed through the Peltier heat exchanger, to flow into the second pump, and controls a second 3-way valve to allow the coolant, which passed through a condenser, to flow into the Peltier heat exchanger;
an interior cooling step in which, in a cooling mode of a vehicle interior, the controller opens the on-off valve, controls the Peltier heat exchanger to be in a cooling mode, controls the first 3-way valve to allow the coolant, which passed through the Peltier heat exchanger, to flow into the first pump, and controls the second 3-way valve to allow the coolant, which passed through the condenser, to flow into a radiator; and
a seat cooling step in which, in a cooling mode of a ventilated seat for a vehicle, the controller operates a blower of the ventilated seat to generate cool air in the ventilated seat through the cool coolant flowing in a heat exchanger of the ventilated seat.

13. The control method of claim 12, wherein the integrated independent air conditioning system comprises:
a refrigerant line, through which a refrigerant circulates, including a compressor, the condenser, and an evaporator core;
the Peltier heat exchanger arranged to perform air conditioning of the vehicle interior through a Peltier element;
a ventilated seat for the vehicle in which the blower and a heat exchanger are arranged;
a cooling circulation line arranged such that coolant passes through the first pump, the evaporator core of the refrigerant line, the on-off valve, the Peltier heat exchanger, and the first 3-way valve;
a seat circulation line that branches off from an upper side of the on-off valve of the cooling circulation line, passes through the heat exchanger of the ventilated seat, and then joins an upper side of the first pump;
a heating circulation line arranged such that coolant passes through the second pump, the condenser of the refrigerant line, the second 3-way valve, the Peltier heat exchanger, and the first 3-way valve;
a radiator circulation line that branches off from the second 3-way valve of the heating circulation line, passes through the radiator, and then joins an upper side of the second pump; and
the controller for controlling operations of the on-off valve, the Peltier heat exchanger, the blower, the first 3-way valve, the second 3-way valve, the first pump, and the second pump.

* * * * *